(No Model.)

W. S. LAMSON.
CASH CARRIER FOR STORE SERVICE.

No. 301,373. Patented July 1, 1884.

Attest:
Curt A Cooper
K. E. Hansmann

W. S. Lamson
Inventor:
By Foster & Freeman
Attys

UNITED STATES PATENT OFFICE.

WILLIAM S. LAMSON, OF LOWELL, MASSACHUSETTS.

CASH-CARRIER FOR STORE SERVICE.

SPECIFICATION forming part of Letters Patent No. 301,373, dated July 1, 1884.

Application filed May 2, 1884. (No model.)

*To all whom it may concern:*

Be it known that I, WM. S. LAMSON, a citizen of the United States, residing at Lowell, in the county of Middlesex and State of Massachusetts, have invented certain new and useful Improvements in Cash-Carriers for Store-Service Apparatus, of which the following is a specification.

My invention has for its object to prevent the liability of rattling and separation, which results from the separation of the bearings in the rolling carriers used in store-service apparatus; and my invention consists in providing yielding frictional bearings upon one part of the carrier for the lugs upon the other part of the carrier, as fully described hereinafter, and as illustrated in the accompanying drawings, in which—

Figure 1:
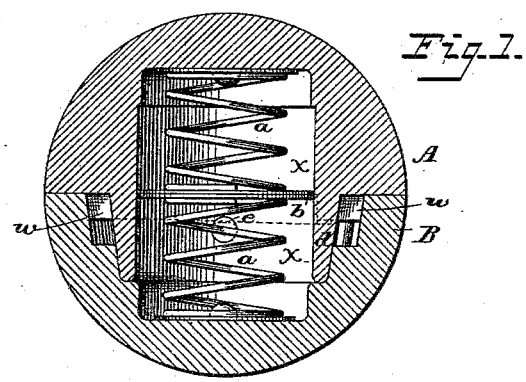
Figure 2:
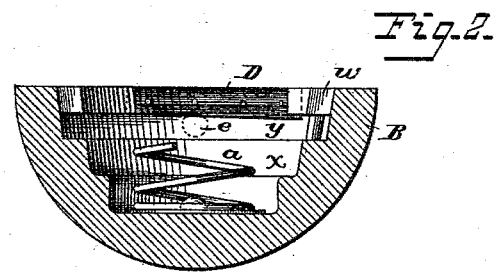
Figure 3:
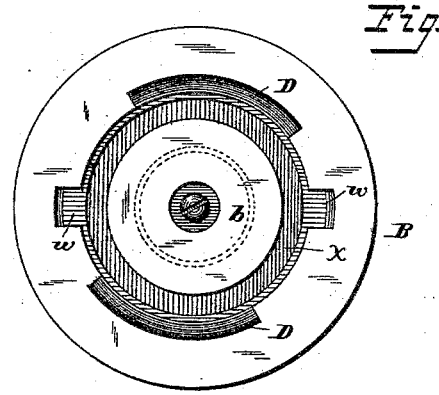
Figure 4:
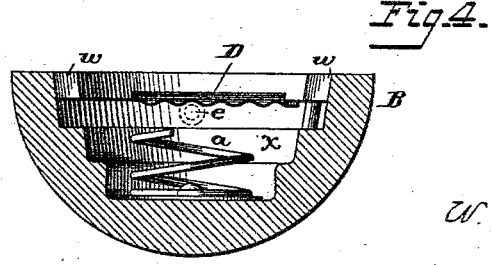

Figure 1 is a sectional view of a ball-carrier illustrating my invention. Fig. 2 is a section of one of the hemispheres. Fig. 3 is a plan of Fig. 2. Fig. 4 is a section of a hemisphere illustrating a modification.

A and B represent the two hemispheres of an ordinary ball-carrier, the section A having the usual recess, $x$, and the surrounding annular flange $d$, which extends into a recess in the section B. The section B is provided with a groove, $y$, and notches $w$, the latter adapted for the passage of lugs $e$, projecting from the flange $d$, so that when the two parts are brought together, as shown in Fig. 1, the lugs may be carried into the two parts of the groove $y$ upon opposite sides of the notches $w$. The upper faces of the groove-sections constitute the bearings of the lugs $e$, and when the latter become worn the two sections are so loosely confined that they are apt to rattle and sometimes separate. To prevent this I provide for a yielding bearing which will prevent the lost motion and insure frictional contact regardless of the extent to which the bearing-faces may become worn. Such bearing-faces may be secured in different ways. For instance, the lug $e$ may be surrounded with a rubber sleeve or ring, as shown in dotted lines, Fig. 4. I prefer, however, to make the face with which the lug is brought in contact the yielding bearing. One mode of securing this result is shown in Figs. 1, 2, 3, where the section B is cut away above the groove $y$, and the block D, of rubber, leather, or other yielding material, is inserted in place of the portion removed, the lower face of the block constituting the upper face of the groove $y$ and the bearing for the lug $e$. By providing yielding bearings for the lugs $e$ the contact of the lugs with their bearings is insured, regardless of the extent to which the bearings may wear away, while the slight embedding of the lugs in the bearing-surfaces insures such a frictional contact as will effectually prevent the lug from moving upon the said surface.

The block D, instead of being inserted in the recess in the section B, may be let into a recess in the upper face of the groove $y$, or cemented to said face, as shown in Fig. 4, and the said block or strip may be corrugated, as shown, to secure a greater friction.

The bearing-face in the part B may be inclined, as shown in Fig. 4, to secure increased friction as the part A is turned.

Without limiting myself to the precise construction and arrangement of parts shown, I claim—

1. A carrier consisting of two separable parts locked together, one part having a yielding bearing against the other at the point where the locking faces are in contact, for the purpose set forth.

2. The combination of the two sections, one having lugs and the other bearing-faces for said lugs, of yielding material, substantially as and for the purpose set forth.

3. The combination, in a carrier, of the part A, having a flange and projecting lugs, and the part B, with bearings for said lugs, of yielding material, the latter being between the locking faces, substantially as specified.

In testimony whereof I have signed my name to this specification in the presence of two subscribing witnesses.

WILLIAM S. LAMSON.

Witnesses:
E. F. ENDICOTT,
CHAS. A. COX.